United States Patent
Müllers

(10) Patent No.: US 9,906,004 B2
(45) Date of Patent: Feb. 27, 2018

(54) METHOD FOR DETERMINING STRIPPING PARAMETERS FOR STRIPPING A CABLE

(71) Applicant: Komax Holding AG, Dierikon (CH)

(72) Inventor: Harald Müllers, Dietwil (CH)

(73) Assignee: KOMAX HOLDING AG, Dierikon (CH)

(*) Notice: Subject to any disclaimer, the term of this patent is extended or adjusted under 35 U.S.C. 154(b) by 178 days.

(21) Appl. No.: 14/644,451

(22) Filed: Mar. 11, 2015

(65) Prior Publication Data

US 2015/0263494 A1  Sep. 17, 2015

(30) Foreign Application Priority Data

Mar. 11, 2014 (EP) .................................... 14158973

(51) Int. Cl.
*H01R 43/00* (2006.01)
*H02G 1/12* (2006.01)

(52) U.S. Cl.
CPC ...... *H02G 1/1253* (2013.01); *Y10T 29/49821* (2015.01)

(58) Field of Classification Search
CPC .... H01B 13/145; H01B 13/228; H01B 13/22; F27D 5/00; F27D 7/00
See application file for complete search history.

(56) References Cited

U.S. PATENT DOCUMENTS

| | | | | |
|---|---|---|---|---|
| 3,645,156 A | * | 2/1972 | Meyer ................ | H02G 1/1258 81/9.51 |
| 3,934,786 A | * | 1/1976 | Kozak ................... | H01R 4/625 228/138 |
| 5,272,941 A | * | 12/1993 | English ................ | H02G 1/1256 81/9.51 |
| 5,361,653 A | * | 11/1994 | Pradin ................ | H02G 1/1265 81/9.51 |
| 8,739,657 B2 | * | 6/2014 | Nakamura ............... | H02G 1/12 81/9.4 |
| 9,397,488 B2 | * | 7/2016 | Viviroli ................ | H02G 1/1253 |
| 2014/0041486 A1 | | 2/2014 | Viviroli et al. | |

FOREIGN PATENT DOCUMENTS

| | | | |
|---|---|---|---|
| DE | 4033315 C1 | 4/1992 | |
| DE | 102007053825 A1 | 5/2009 | |
| JP | 57084402 A * | 5/1982 | ............ G02B 6/245 |
| JP | 2007151289 A | 6/2007 | |
| JP | 2008061460 A | 3/2008 | |
| WO | 2012015062 A1 | 2/2012 | |

* cited by examiner

*Primary Examiner* — Paul D Kim
(74) *Attorney, Agent, or Firm* — William J. Clemens; Shumaker, Loop & Kendrick, LLP

(57) ABSTRACT

Determining at least one stripping parameter for stripping a cable containing a conductor by: a) cutting an insulation up to a cutting depth of a cable with at least one stripping knife, wherein an initial cutting depth is selected to be the cutting depth, which ensures that the at least one stripping knife comes in contact with the conductor; b) stripping the cut insulation by moving the at least one stripping knife in a longitudinal direction in relation to the cable; c) determining by a detecting unit whether the at least one stripping knife has come in contact with the conductor in the step a); and d) repeating the steps a) to c), wherein in each case the cutting depth is reduced by a cutting feed value until a conductor contact can no longer be determined, whereby the stripping cutting depth is maintained in a parameter determination phase.

12 Claims, 3 Drawing Sheets

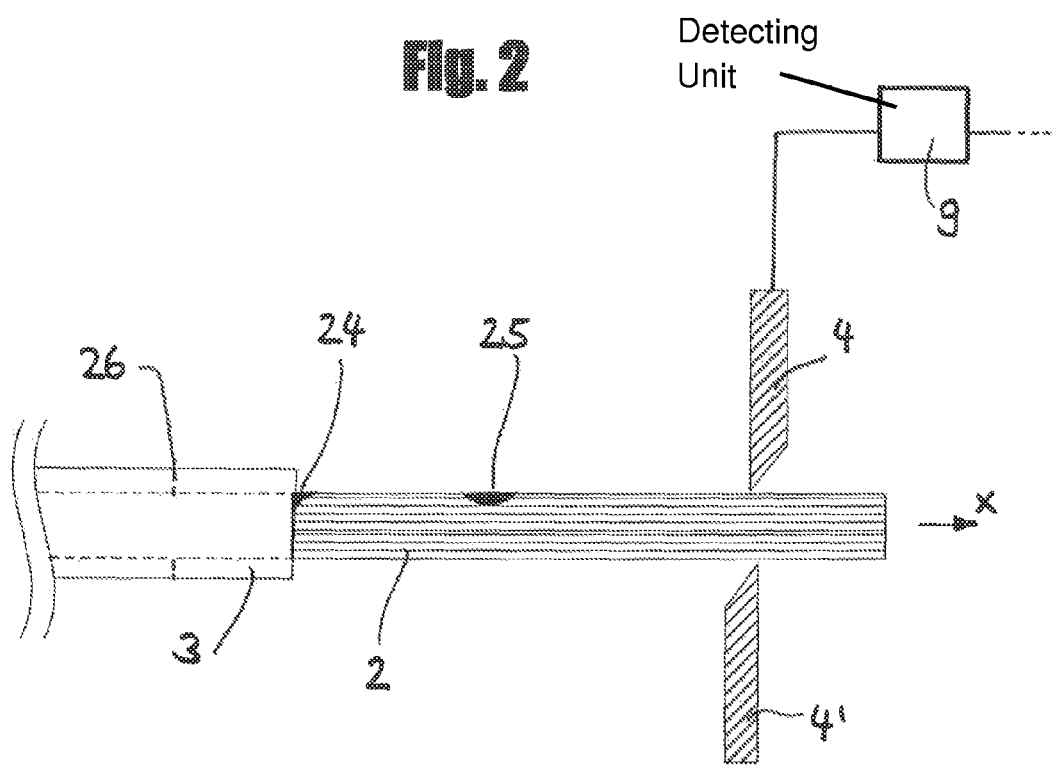
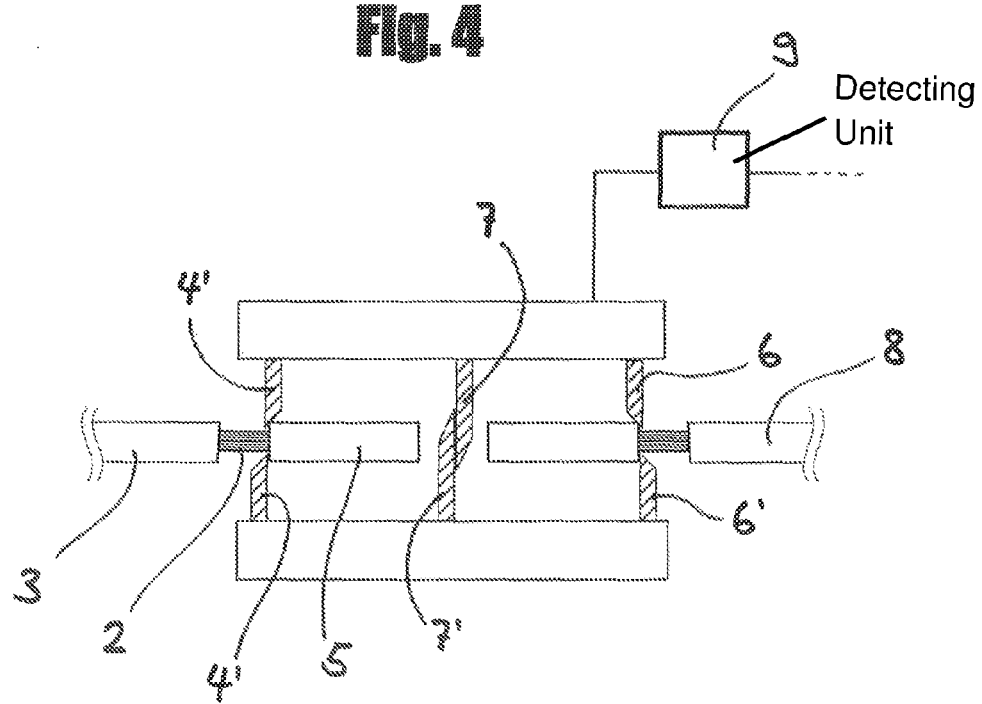

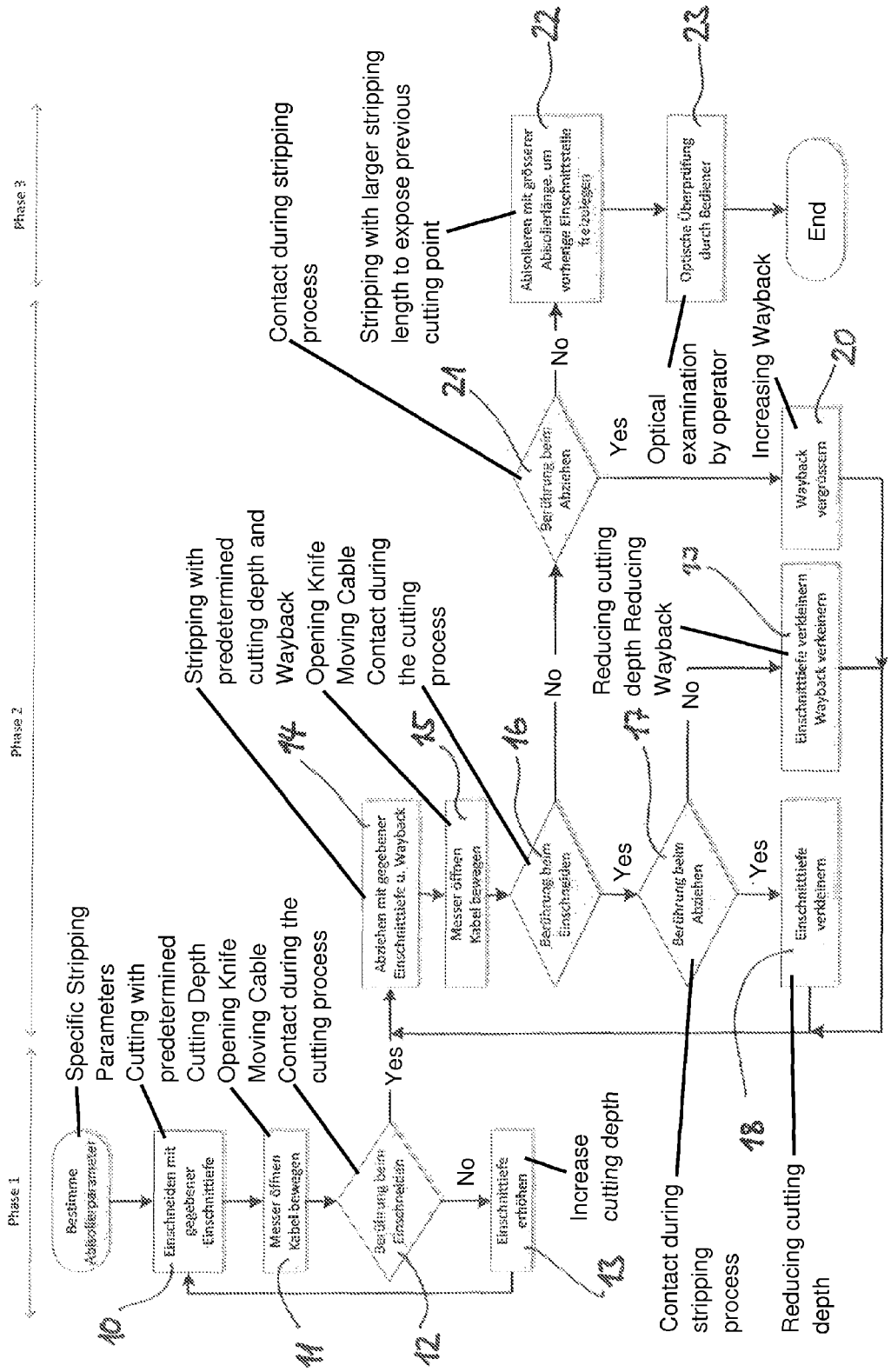

METHOD FOR DETERMINING STRIPPING PARAMETERS FOR STRIPPING A CABLE

FIELD

The invention relates to a method for determining at least one stripping parameter for stripping a conductor-containing cable.

BACKGROUND

Devices and methods for stripping electrical cables have been known for a long time. To obtain good stripping results, it is important to cut the cable as close to the conductor as possible. Besides the cutting depth as a first stripping parameter, it is often advantageous that, after cutting, the stripping knife is slightly moved away from the cable or opened with a backing-up movement. Experts refer to this movement also as "wayback".

WO 2012/015062 A1 describes a device for stripping cables using a detecting unit for determining whether the stripping knives come in contact with the conductor contacts. Prior to the actual stripping process, the two stripping parameters, the cutting depth and the backing-up or opening of the knife (wayback), have to be adjusted by the operator. The cutting process is complex, time-consuming and possibly not very reliable. For untrained or inexperienced persons, who operate the respective workstations, it can be difficult to determine optimum stripping parameters.

SUMMARY

Therefore, it is an object of the invention to prevent the known disadvantages and to provide in particular a method for determining at least one stripping parameter for stripping a conductor-containing cable, which makes it easy to determine in a reliable manner the stripping parameter(s).

According to the invention, this object is achieved with a method described in the following. After providing a cable extending in longitudinal direction, which consists of an electrical conductor (for example, a wire or strand) and insulation surrounding the conductor, the insulation is first cut to a specific cutting depth (CD) with at least one stripping knife (step a)). At the beginning of the procedure, an initial cutting depth (CD1) is selected (CD=CD1), which ensures that the at least one stripping knife comes in contact with the conductor. For example, the initial cutting depth (CD1) can be calculated based on the technical data of the cable disclosed by the manufacturer. Alternatively, it is also possible to use cutting depths known from previous determination processes. After step a), the cut insulation is stripped by moving the at least one stripping knife in longitudinal direction in relation to the cable (step b)). For example, this relative movement for stripping the insulation involves moving the stripping knife while holding the cable or moving the cable while holding the stripping knife. A further step of the method involves the determination of a conductor contact during the cutting process (step c)). When a conductor contact takes place, the insulation is cut again, wherein the cutting depth is now reduced by a cutting feed value (DCD). In a second process cycle (or second step sequence), the cutting depth (CD) amounts to CD1−DCD. Then another stripping process takes place and it is again determined or examined whether a conductor contact took place during the cutting process. When it is determined that no conductor contact took place during the cutting process, the cutting depth is again reduced by the cutting feed value (DCD). In the following third process cycle, the actual cutting depth amounts to CD=CD1−DCD−DCD. The process steps a)-c) are repeated, reducing in each case the cutting depth by the cutting feed value (DCD), until a conductor contact can no longer be determined, whereby the stripping cutting depth (CD2) is maintained in a parameter determination phase. After each stripping process or between the process cycles, a cable section with a stripped cable end can be severed. Theoretically it is also possible to wait two or more process cycles before cutting the cables to length. It is easy to automate the procedure and to perform the process on a cable processing station. The stripping cutting depth (CD2) thus maintained can then be used for mass production of cables to be manufactured. The method meets high requirements of reliability.

Furthermore, it can be advantageous when for the stripping process the at least one stripping knife is moved away from the cable by a wayback (WB). Besides the cutting depth, the knife opening or wayback (WB) represents the second stripping parameter to be determined.

When a knife opening is provided, it is advantageous to determine an optimum wayback in addition to the stripping cutting depth. This can be done in a manner analogous to determining the stripping cutting depth: after performing the cut according to the above-mentioned step a), the at least one stripping knife is moved by a wayback (WB) away from the cable in relation to the cutting depth. When a conductor contact takes place, steps a) to c), as well as the step of moving away, are repeated, wherein in the parameter determination phase the wayback between the process cycles is increased in each case by a wayback feed value (DWB) until a conductor contact is no longer determined during the stripping process, thus maintaining the stripping wayback function (WBF). As a result, it is possible to determine in an efficient manner the two most important stripping parameters.

It can also be advantageous that the cable end stripped by means of the stripping cutting depth (CD2) and stripping-wayback (WBF) is stripped again, so as to expose the cutting point. Preferably, this process step is performed on the same device on which the parameter determination phase had been applied. Theoretically, it would be also possible to strip the stripped cable end manually or with a specific separate device.

It is especially advantageous when the cable is optically examined for damages (for example, with a microscope) in the region of the exposed cutting point. In this way it can be ensured that the conductor of the cable actually remained undamaged, thus increasing again the product reliability.

A further embodiment involves a method for determining at least one stripping parameter (CD, WB) for stripping a cable containing a conductor with the following above-mentioned parameter determination phase, which preferably precedes the first phase. The first phase is characterized by the following process steps: a) cutting with at least one stripping knife an insulation up to a predetermined cutting depth (CDN) of the cable extending along a longitudinal axis; b) determining by means of a detecting unit whether the at least one stripping knife contacts the conductor, c) in the event that the conductor is not contacted, the cable is moved in conveying direction of the cable along the longitudinal axis by a section in relation to the at least one stripping knife; d) repeating the steps described in this section a) to c), wherein in each case the cutting depth is increased by a cutting feed value (DCD) until a conductor contact is determined, whereby in a first phase an initial cutting depth is maintained. In step c), the cable can be moved by means of a conveyor, while the at least one stripping knife is fixed. However, alternatively, it is also possible that the cable is fixed and the at least one stripping knife is moved. The embodiment described above can also be advantageous on its own. A combination with or addition of the above-mentioned parameter determination phase, which, in this case, is described as a first phase, is not required.

It can be especially advantageous when the initial cutting depth (CD1) is used as a starting point for the parameter determination phase. This results in a method which basically consists of two phases: the first phase for determining the initial cutting depth and a second phase, which corresponds to the parameter determination phase, in which the cable is stripped for testing in order to determine a final value for the cutting depth of the cable.

The method can be performed efficiently when the cutting feed values (DCD) for the first phase are larger than the cutting feed values (DCD) for the following parameter determination phase.

It can be especially advantageous when the cutting feed values for the first phase are at least twice as large as and preferably larger than five times the cutting feed values for the parameter determination phase.

Furthermore, the cutting feed value for the first phase can amount to approximately 0.1 mm, respectively, and the cutting feed value for the parameter determination phase can range between 0.01 mm and 0.02 mm, respectively.

A further aspect of the invention can involve a device for performing the method described above.

The invention also involves a computer program with a program code for performing the above-mentioned method when the computer program is performed on a computer.

DESCRIPTION OF THE DRAWINGS

Further individual characteristics and advantages of the invention are included in the subsequent description of embodiments and in the drawings. It is shown:

FIG. 2 is a slightly enlarged representation of a cable with a stripped cable end;

FIG. 3 is a flow diagram showing the invention-based method for determining the stripping parameters; and FIG. 4 is a further device by means of which the invention-based method can be performed.

DETAILED DESCRIPTION

Figure 1A:
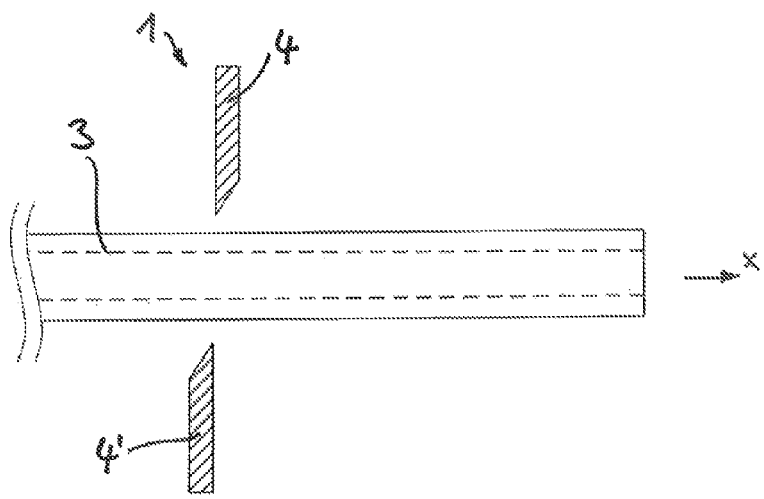
FIG. 1A is a highly simplified representation of a cable and a stripping unit with two stripping knifes in start position.

The device 1 shown in FIGS. 1A through 1D with a stripping unit for stripping an electrical cable 3 comprises a set of knives with two stripping knives 4 and 4' that can be moved in relation to one another. For the purpose of cutting the insulation, the knives can be moved in radial direction toward the conductor 2 of the cable 3. FIGS. 1A-1D show the generally well-known individual process steps for stripping a cable. When using the stripping knives for cutting, the cutting depth of the knives should be in such a way that the insulation 5 is cut as deep as possible, but without producing a recess on one or several strands of the conductor 2 consisting, for example, of copper material or aluminum. Often, the cutting depth is slightly reduced during the stripping process so that the knives do not scratch the strands. However, the stripping knives should have enough coverage toward the insulation that the insulation sheath can be safely stripped. Contacting the cable during the stripping process could result in the fact that because of the reduced copper mass the stranded wire package could no longer be compacted sufficiently, for example, in a subsequent crimping process, or the exposed strands could cause short circuits with other electrical components. Furthermore, recesses can result in the fact that strands break during the crimping process or later as a result of mechanical stress, thus reducing the active cross-section and die mechanical connection strength. The special feature of the method described below is the special combination of these process steps and connection to process cycles for determining the two stripping parameters, i.e., the cutting depth and knife opening or wayback.

Figure 1B:
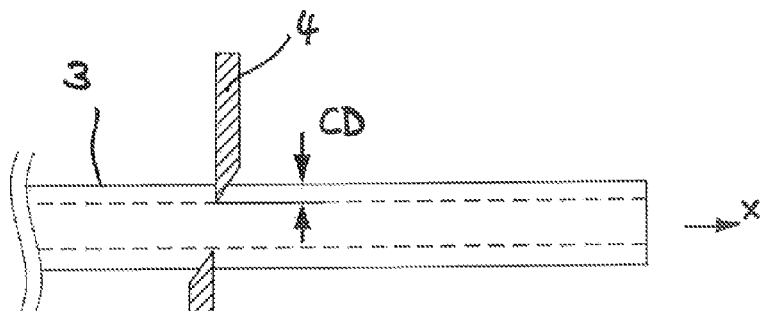
FIG. 1B is the cable after the cable insulation has been cut.
Figure 1C:
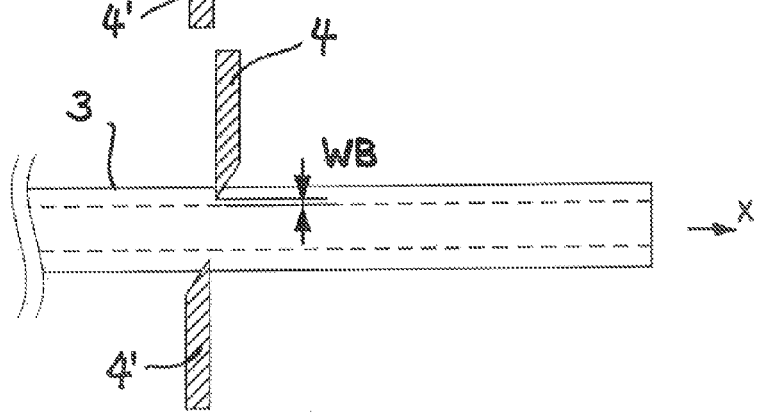
FIG. 1C is the cable with stripping knives opened by the wayback.
Figure 1D:
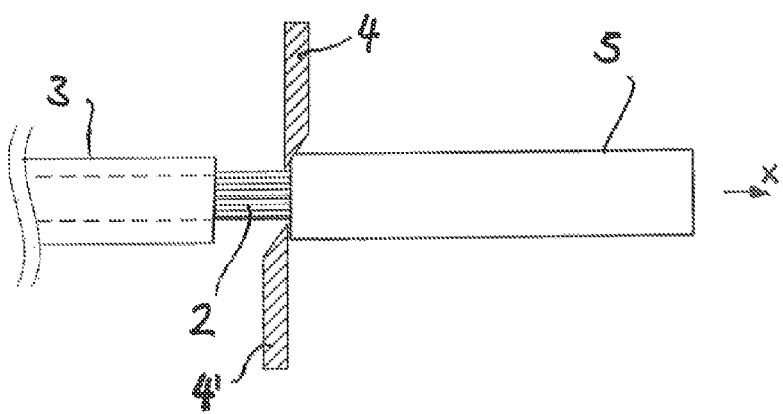
FIG. 1D is the cable during a stripping process.

FIG. 1A shows the stripping knives 4, 4' of the device 1 in a start position. Subsequently, the stripping knives 4, 4' are moved toward each other and the insulation of the cable 2 is cut on both sides. Each of the stripping knives 4, 4' can have a V-shaped cutting geometry. The stripping knives could certainly also have straight blades or cutting edges or different cutting geometries (for example, with a curvature). The cutting depth is referenced with CD. The cutting process is shown in FIG. 1B. Prior to stripping, the stripping knives 4, 4' are slightly opened with a backing-up movement. In FIG. 1C, the wayback or knife opening is referenced with WB. In this radial position (CD −WB), the cut insulation is stripped with a relative movement between the stripping knives 4, 4' and the cable 3. The insulation 5 is removed from the cable 3 in x-direction. By means of a detecting unit (not shown), it is determined whether the knives 4, 4' come in contact with the conductor 2 during the cutting process (FIG. 1B) and during the stripping process (FIG. 1D). In the event that conductor contacts are determined, an evaluation unit (not shown) produces a command for repeating the stripping process, wherein, depending on the situation, the cutting depth CD and wayback WB are adjusted. The exact process sequence is subsequently described in more detail by means of FIG. 3.

FIG. 2 shows a stripped conductor end of the conductor 2 of the cable 3 and a set of stripping blades 4, 4' which is currently situated in a longitudinal position on the x-axis. The sleeve-like insulation removed by a partial stripping process is not shown. In the present embodiment, the conductor 2 was damaged in an exemplary manner by conductor contacts during the stripping process. The two damaged sections are indicated with reference numerals 24 and 25. Reference numeral 9 shows the detecting unit for determining conductor contacts. For example, the device described in WO 2012/015062 A1 or in DE 10 2007 053 825 A1 could be used as the detecting unit. Particularly advantageous detecting units are those that make it possible to determine the longitudinal positions (x) of the stripping knives during the stripping process. The invention-based method allows for determining automatically the optimum adjustment values for the cutting depth and wayback by means of an appropriate sequence of several cutting and stripping processes. At the same time, advantage is taken of the fact that, depending on the time of evaluation, the contact sensor can determine the location of contact (during the cutting process or stripping process). The reference numeral 24 indicates the damaged section, which was caused by a conductor contact during the cutting process; reference numeral 25 relates to a conductor contact during the stripping process. To ensure that conductor contacts are reliably detected during the cutting process, the cable 3 is stripped again in the region indicated with reference numeral 26, whereby the damaged section 24 is exposed and can now be examined under a microscope.

FIG. 3 shows the operational sequence of the invention-based method for determining the stripping parameters for stripping a cable containing a conductor. Obviously, the method has a multi-phase design. In a first phase, which FIG. 3 depicts as "Phase 1", an initial cutting depth is determined. In the subsequent second phase, depicted in FIG. 3 as "Phase 2", the stripping parameters are determined. For purposes of verification, it is possible to perform an optical examination of the stripped conductor ends. However, this third phase, depicted in FIG. 3 as "Phase 3" is optional.

In the first phase (Phase 1), the cutting depth (CD1) is determined without stripping the insulation. The cable 3 is cut with the knife based on the theoretical cutting depth (CDN) calculated from the cable diameter and knife geometry (step 10). When no contact between cable and stripping knife is detected by a contact sensor or any other detecting device (12), the set of blades is opened, the cable is slightly moved forward (step 11) and another cutting process is performed with an increased cutting depth (step 13) (back to step 10). The cutting process is repeated and the cutting depth increased until the contact sensor detects a contact between the knife and the cable (step 12: contact during the cutting process? Yes). When no conductor contact is determined during the cutting process, the cutting depth is advantageously increased by a predetermined value DCD and the process is repeated with a cutting depth increased by DCD. For example, the cutting feed value DCD amounts to 0.1 mm. During the repeat process of in the second process cycle, the cutting depth amounts to CD=CDN +DCD. In the n-th process cycle, the cutting depth amounts to CD=CDN+n DCD. As soon as a contact is determined, the most recent value of the cutting depth is used for performing parameter determination phase "Phase 2". This most recent value of the cutting depth is described as initial cutting depth CD1. Using CD1 as starting point, the cable is stripped on an experimental basis in the second phase 2, according to the process sequence shown in FIG. 3.

Finally, in the second phase, the ultimate cutting depth and wayback for stripping cables are determined as a component of the production process for manufacturing cables. Depending on the results of the contact sensor, the cutting depth and knife opening during the stripping process is adjusted on a step-by-step basis. Starting at the most recent cutting depth (CD1) from Phase 1, the cable is completely stripped. During the stripping process, the radial position of the stripping knives is maintained. Consequently, at the start of Phase 2, the wayback or knife opening (WB) for the first stripping process corresponds to zero. However, it is also possible to provide already at the start a predetermined wayback determined by a previous value. FIG. 3 depicts the process step with the wayback with the reference numeral 14. The stripping knives are brought into an opened position (starting position) and the cable is moved forward in axial direction, for example, by means of a belt or roller conveyor (step 15). It is advantageous when the cable is cut to length at the conclusion of step 15. When a determination unit determines that a conductor contact took place during the cutting process (step 16), the cutting of the insulation is repeated (back to step 14), wherein the cutting depth is now reduced by a cutting feed value (DCD) (step 18 or 19). As a result, in a second process cycle, the cutting depth amounts to CD1−DCD. Then, the stripping process is repeated and again examined whether a conductor contact took place during the cutting process. These process steps are repeated, reducing in each case the cutting depth by the cutting feed value (DCD), until a conductor contact can no longer be determined, whereby the stripping cutting depth (CD2) is maintained in a parameter determination phase.

At the beginning of Phase 2, the radial position of the stripping knives during the stripping process corresponds to the last position after concluding the cutting process (i.e., WB=0). When in step 21 an evaluation unit determines a conductor contact, the process cycle is now performed by means of a wayback with the value DWB (back to step 14). In the parameter determination phase, the wayback between the process cycles is increased, respectively, by the wayback feed value DWB. This process cycle is repeated until a conductor contact can no longer be determined during the stripping process. In this way, it is easy to determine the stripping wayback (WBF). However, as long as conductor contacts take place during the cutting process in step 16 and subsequently no conductor contacts are determined during the stripping process, starting with step 14, the process cycle according to FIG. 3 is repeated with a cutting depth reduced by DCD and a wayback increased by DWB. The cutting feed values DCD for Phase 1 are usually larger than the cutting feed values DCD for the following parameter determination phase (Phase 2). Advantageous feed values for the stripping knives result when DCD for Phase 1 amounts to 0.1 mm and DCD for Phase 2 amounts to between 0.01 mm and 0.02 mm.

In specific situations, it is also possible to relinquish a performance of Phase 1. For example, when the stripping parameters are known from a previous production, Phase 1 can be omitted and the process can be started with Phase 2. At the same time, it is possible to increase the cutting depth selected at the start of the process with respect to the cutting depth known from the previous production, in order to ensure that the cutting process is started with a contact.

Before releasing the production with the determined stripping parameters, it can be required that an optical examination by the operator is performed. Phase 3 involves such an optical examination of the stripping results after preparing the cutting point. To ensure better examination of the place of the cable that is to be cut, an additional stripping process is performed with increased stripping length (step 22). The "doubly stripped" cable is provided for optical verification under the microscope or similar measuring device and examined (step 23). When the results of stripping correspond to the required standard, the stripping parameters (CD2, WBF) can be accepted for production.

FIG. 4 shows that the previously described method can also be performed with a device 1 which has two sets of stripping blades 4, 4' and 6, 6', as well as a splitting knife 7, 7'. Because of uneven abrasion of the knives or incorrect assembly, it can be practical in this arrangement to repeat the determination of the stripping parameters for the stripped cable section 8 to prevent the cable from being damaged. For example, in this case, the first phase (Phase 1) is performed first at the cable end of the remaining cable 3 (see FIG. 3). Subsequently, the parameter determination phase (Phase 2) is performed for both cable ends 3 and 8. In Phase 3 both ends of the cable are also examined.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for determining at least one stripping parameter for stripping a cable containing a conductor in a process cycle, comprising the steps of:
   a) cutting an insulation extending along a longitudinal axis of the cable up to a cutting depth with at least one stripping knife, wherein, at a beginning of the method, an initial cutting depth is selected to be the cutting depth, which the initial cutting depth ensures that the at least one stripping knife comes in contact with the conductor;
   b) stripping the cut insulation by moving the at least one stripping knife in a direction along the longitudinal axis of the cable, wherein the at least one stripping knife is moved by a wayback away from the cable in relation to the cutting depth, at least for a possible second process cycle;
   c) determining by a detecting unit whether the at least one stripping knife has come in contact with the conductor during the step a); and
   d) repeating the steps a) through c), wherein the cutting depth is reduced by a cutting feed value until a conductor contact can no longer be determined whereby a last reduced cutting depth is maintained as a stripping cutting depth in a subsequent parameter determination phase;
   wherein after the cutting step a) is performed, the at least one stripping knife is moved by the wayback away from the cable in relation to the cutting depth and when the conductor contact takes place, the steps a) to c), as well as the step of moving, are repeated, wherein in a parameter determination phase the wayback between process cycles is increased in each case by a wayback feed value until the conductor contact is no longer determined during the step c), thus maintaining a stripping wayback function.

2. The method according to claim 1 wherein after the stripping step b) is performed, a cable section with a stripped cable end is severed from the cable.

3. The method according to claim 1 wherein at a start of the method a first one of the stripping step b) is performed without wayback.

4. The method according to claim 1 wherein after concluding the parameter determination phase the cable end stripped by means of the stripping cutting depth and stripping wayback is stripped again so as to expose a cutting point.

5. The method according to claim 4 wherein the cable in a region of the exposed cutting point is optically examined for damages.

6. A method for determining at least one stripping parameter for stripping a cable containing a conductor in a first phase, comprising the steps of:
   a) cutting an insulation extending along a longitudinal axis of the cable up to a cutting depth with at least one stripping knife;
   b) determining by a detecting unit whether the at least one stripping knife has come in contact with the conductor;
   c) when no conductor contact exists, moving the cable by a section in a conveying direction along the longitudinal axis in relation to the at least one stripping knife; and
   d) repeating the steps a) to c), wherein the cutting depth is reduced by a cutting feed value until a conductor contact can no longer be determined, whereby a last reduced cutting depth is maintained as a stripping cutting depth in a subsequent parameter determination phase.

7. The method according to claim 6 wherein an initial cutting depth is used as a starting point.

8. The method according to claim 6 wherein the cutting feed values of the step d) are larger than cutting feed values for the subsequent parameter determination phase.

9. The method according to claim 6 wherein the cutting feed values of the step d) are at least twice as large as the cutting feed values for the subsequent parameter determination phase.

10. The method according to claim 6 wherein the cutting feed values of the step d) are larger than five times the cutting feed values for the subsequent parameter determination phase.

11. The method according to claim 6 wherein each of the cutting feed values of the step d) is 0.1 mm and the cutting feed values for the subsequent parameter determination phase are between 0.001 mm and 0.02 mm.

12. A method for determining at least one stripping parameter for stripping a cable containing a conductor in a first phase, comprising the steps of:
   a) cutting an insulation extending along a longitudinal axis of the cable up to a cutting depth with at least one stripping knife;
   b) determining by a detecting unit whether the at least one stripping knife has come in contact with the conductor;
   c) when no conductor contact exists, moving the cable by a section in a conveying direction along the longitudinal axis in relation to the at least one stripping knife; and
   d) repeating the steps a) to c), wherein the cutting depth is reduced by a cutting feed value until a conductor contact can no longer be determined, whereby a last reduced cutting depth is maintained as a stripping cutting depth in a subsequent parameter determination phase;
   wherein the method is performed with a cutting and stripping device with at least one splitting knife used for severing the cable, the at least one stripping knife being a first stripping knife used for stripping a rear end of a cable section cut with the at least one splitting knife, and a second stripping knife used for stripping a front end of a remaining portion of the cable, wherein the steps a) through d) are performed by the first stripping knife at the cut cable section or by the second stripping knife at the remaining cable portion, and that the subsequent parameter determination phase is performed at the cut cable section and at the remaining cable.

* * * * *